US009513856B2

(12) United States Patent
Ehrhardt et al.

(10) Patent No.: US 9,513,856 B2
(45) Date of Patent: Dec. 6, 2016

(54) BEAM SHAPING NEAR FIELD COMMUNICATION DEVICE

(71) Applicant: ZIH Corp., Lincolnshire, IL (US)

(72) Inventors: Robert A. Ehrhardt, Palatine, IL (US); Robert S. Gawelczyk, Chicago, IL (US); Derek J. Hampson, Mundelein, IL (US); Dan E. Monnier, Arlington Heights, IL (US); James M. Rehberger, Franklin, WI (US); Mark B. Urban, Mundelein, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/565,381

(22) Filed: Dec. 9, 2014

(65) Prior Publication Data

US 2016/0162228 A1 Jun. 9, 2016

(51) Int. Cl.
G06K 15/02 (2006.01)
G06F 3/12 (2006.01)
H04W 4/00 (2009.01)
G06K 15/00 (2006.01)

(52) U.S. Cl.
CPC ........... *G06F 3/1236* (2013.01); *G06F 3/1211* (2013.01); *G06F 3/1292* (2013.01); *G06K 15/40* (2013.01); *G06K 15/4025* (2013.01); *H04W 4/008* (2013.01)

(58) Field of Classification Search
None
See application file for complete search history.

(56) References Cited

U.S. PATENT DOCUMENTS

| 6,109,800 A | 8/2000 | Suzuki | |
|---|---|---|---|
| 2002/0191998 A1* | 12/2002 | Cremon | B41J 5/30 400/76 |
| 2003/0128269 A1* | 7/2003 | Squires | B41J 35/36 347/214 |
| 2004/0233789 A1 | 11/2004 | Oguchi | |

(Continued)

FOREIGN PATENT DOCUMENTS

| EP | 2728517 A1 | 5/2014 |
|---|---|---|
| JP | 2004-322403 | 11/2004 |

(Continued)

OTHER PUBLICATIONS

International Search Report and Written Opinion from corresponding International Patent Application No. PCT/US2015/064381 mailed on Jun. 15, 2016.

(Continued)

*Primary Examiner* — Beniyam Menberu

(57) ABSTRACT

Systems, devices, and related methods for shaping near field interrogation signals are discussed herein. Some embodiments may provide for a printer that includes a housing and a beam shaping near field communication (NFC) device secured with the interior surface. The beam shaping NFC device may include a ferromagnetic component including a core portion and a bottom flange portion. The beam shaping NFC device may further include a wire coil disposed around the core portion. The ferromagnetic component may concentrate near field interrogation signals generated by the wire coil toward a near field interrogation region and away from nearby conductive components, such as the interior surface of the printer.

17 Claims, 5 Drawing Sheets

(56) References Cited

U.S. PATENT DOCUMENTS

| | | |
|---|---|---|
| 2006/0238600 A1 | 10/2006 | Vandermeulen |
| 2007/0040876 A1* | 2/2007 | Anderson ............ B41J 2/17546 347/86 |
| 2007/0171020 A1 | 7/2007 | Morimoto et al. |
| 2007/0274242 A1* | 11/2007 | Lamacraft .......... G06K 19/0723 370/310 |
| 2008/0044195 A1 | 2/2008 | Higashiyama |
| 2008/0073457 A1* | 3/2008 | Milton ................ B65H 75/182 242/613.5 |
| 2008/0238799 A1 | 10/2008 | Tsushima |
| 2008/0297318 A1* | 12/2008 | Ohashi .................. G06K 17/00 340/10.1 |
| 2008/0298870 A1 | 12/2008 | Tsirline et al. |
| 2009/0027163 A1 | 1/2009 | Su |
| 2009/0033581 A1* | 2/2009 | Ross ........................ H01Q 1/38 343/876 |
| 2009/0045919 A1* | 2/2009 | Fukui ...................... H01Q 7/00 340/10.1 |
| 2009/0121835 A1* | 5/2009 | Borret .................. G06K 7/0008 340/10.1 |
| 2009/0184817 A1* | 7/2009 | Ishizuka .................... B41J 3/50 340/539.1 |
| 2010/0219942 A1 | 9/2010 | Lee |
| 2012/0235636 A1 | 9/2012 | Partovi |
| 2013/0256420 A1 | 10/2013 | Rasanen |
| 2014/0253275 A1* | 9/2014 | Shijo ...................... H01F 27/34 336/105 |
| 2014/0293748 A1 | 10/2014 | Altman et al. |

FOREIGN PATENT DOCUMENTS

| | | | | |
|---|---|---|---|---|
| JP | 2005-094737 | * | 4/2005 | ............. H01Q 7/06 |
| JP | 2010-004429 A | | 1/2010 | |

OTHER PUBLICATIONS

The United States Patent and Trademark Office, "Non-Final Office Action," issued on Mar. 14, 2016 in connection with U.S. Appl. No. 14/642,589.

Final office action issued by the USPTO for U.S. Appl. No. 14/642,589 mailed Sep. 15, 2016.

* cited by examiner

BEAM SHAPING NEAR FIELD COMMUNICATION DEVICE

FIELD

The present invention relates to radio frequency identification (RFID) and, in particular, to beam shaping near field communication (NFC) devices capable of concentrating near field interrogation signals at a targeted near field interrogation region within a printer.

BACKGROUND

RFID transponders, either active or passive, are typically used with an RFID transceiver or similar device to communicate information from the transponders. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by modulating the field in a well-known technique called backscattering. In the case of an active transponder, the transponder may respond to the electromagnetic field by transmitting an independently powered reply signal to the transceiver.

Problems can occur, however, when the RFID transceiver and RFID transponder are confined within the space of an interior housing, such as that of a printer or other apparatus. For example, nearby metallic housing can cause interference and degradation of the magnetically sensitive near field patterns passed between the RFID transceiver and RFID transponder. Furthermore, the interior of the housing constrains the spatial arrangement of the RFID transceiver and RFID transponder, thus limiting the available space and locations of the near field interrogation region. In another example, when the RFID transponder is disposed within the interior of a ribbon supply roll of a printer, the near field interrogation signal becomes attenuated when propagating through the ribbon supply roll, and thus more input power is needed for the RFID transceiver to activate the RFID tag.

BRIEF SUMMARY

Through applied effort, ingenuity, and innovation, solutions to improve such RFID systems have been realized and are described herein. In general, techniques are provided to improve the concentration of near field interrogation signals at a targeted near field interrogation region within a printer. Some embodiments may provide for a printer (e.g., a printer-encoder for encoding media units or otherwise) that includes a beam shaping near field communication (NFC) device. The printer may include a housing defining an interior surface of the printer. The beam shaping NFC device may be mechanically secured with the interior surface.

The beam shaping NFC device may include a substrate, a ferromagnetic component, and a wire coil. The substrate may define a first substrate surface and a second substrate surface opposite the first substrate surface. The first substrate surface faces the interior side of the printer and the second substrate surface faces a near field interrogation region of the beam shaping NFC device. The ferromagnetic component may include a core portion and a bottom flange portion mechanically attached with the second substrate surface. The wire coil may be disposed around the core portion. The ferromagnetic component may concentrate near field interrogation signals generated by the wire coil toward the near field interrogation region and away from the interior surface of the printer.

In some embodiments, the beam shaping NFC device may further include a non-conductive bobbin component. The non-conductive bobbin component may include: a bobbin core portion defining a cavity configured to receive the core portion of the ferromagnetic component, and a bobbin top flange portion. The bobbin top flange portion and the bottom flange portion of the ferromagnetic component may be disposed at opposite ends of the core portion of the ferromagnetic component. The wire coil may be disposed around the bobbin core portion between the bobbin top flange portion and the bottom flange portion of the ferromagnetic component.

In some embodiments, the printer may further include a ribbon supply roll mounted to the interior side of the housing. The ribbon supply roll may include: a ribbon supply core, a ribbon, a foil trailer attached to an end of the ribbon, and an RFID tag. The foil trailer may be wrapped around the ribbon supply core and the ribbon may be wrapped around foil trailer. The RFID tag may be disposed between the ribbon supply core and the foil trailer. The ribbon supply roll may be disposed at the interior side of the housing proximate to the beam shaping NFC device such that the RFID tag is located at the near field interrogation region of the beam shaping NFC device In some embodiments, the ferromagnetic component may concentrate the near field interrogation signals generated by the wire coil at the near field interrogation region such that the near field concentrations, after propagating through the ribbon and foil trailer, satisfy an activation level of the RFID tag.

In some embodiments, the beam shaping NFC device may be secured with the interior surface such that the second substrate surface of the beam shaping NFC device faces perpendicular to an outer surface of the RFID tag.

In some embodiments, the interior surface of the printer may be metallic and the ferromagnetic component may concentrate the near field interrogation signals generated by the wire coil away from the interior surface, thereby reducing degradation of the near field interrogation signals when the beam shaping NFC device is disposed at the metallic interior surface of the printer.

In some embodiments, the printer may further include: a transceiver connected the wire coil; and a controller connected with the transceiver and configured to: energize the transceiver to cause the wire coil to generate the near field interrogation signals; subsequent to energizing the transceiver, receive a response signal from the RFID tag; and determine a ribbon type for the ribbon supply roll based on the response signal.

In some embodiments, the controller may be further configured to: receive a tag identifier from the RFID tag of the ribbon supply roll; determine print control parameters based on the tag identifier; and configure the printer for a print operation based on the print control parameters.

In some embodiments, the printer may further include a holder mounted to the interior surface of the printer and configured to removably receive the beam shaping NFC device.

Some embodiments may provide for a method including: securing a beam shaping NFC device with an interior surface of a housing of a printer and proximate to a ribbon supply roll mounted to the interior side of the housing such that an RFID tag of the ribbon supply roll is at a near field interrogation region of the beam shaping NFC device;

energizing a transceiver connected with the beam shaping NFC device to cause a wire coil of the beam shaping NFC device to generate near field interrogation signals; and concentrating, with a ferromagnetic component, the near field interrogation signals generated by the wire coil at the near field interrogation region and away from the interior surface of the printer.

In some embodiments, the beam shaping NFC device may include a substrate defining a first substrate surface and a second substrate surface opposite the first substrate surface, wherein the first substrate surface faces the interior side of the printer and the second substrate surface faces the near field interrogation region of the beam shaping NFC device. The ferromagnetic component may include: a core portion; and a bottom flange portion mechanically attached with the second substrate surface. The wire coil may be disposed around the core portion.

In some embodiments, the beam shaping NFC device may further include a non-conductive bobbin component including: a bobbin core portion defining a cavity configured to receive the core portion of the ferromagnetic component; and a bobbin top flange portion, wherein the bobbin top flange portion and the bottom flange portion of the ferromagnetic component are disposed at opposite ends of the core portion of the ferromagnetic component. The wire coil may be disposed around the bobbin core portion between the bobbin top flange portion and the bottom flange portion of the ferromagnetic component.

In some embodiments, the ribbon supply roll may include: a ribbon supply core; a ribbon; and a foil trailer attached to an end of the ribbon, wherein the foil trailer is wrapped around the ribbon supply core and the ribbon is wrapped around foil trailer. An RFID tag may be disposed between the ribbon supply core and the foil trailer. The ribbon supply roll may be disposed at the interior side of the housing proximate to the beam shaping NFC device such that the RFID tag is located at the near field interrogation region of the beam shaping NFC device.

In some embodiments, concentrating the near field interrogation signals generated by the wire coil at the near field interrogation region may include concentrating the near field interrogation signals such that the near field concentrations, after propagating through the ribbon and foil trailer, satisfy an activation level of the RFID tag.

In some embodiments, securing the beam shaping NFC device with the interior surface of the housing may include securing the beam shaping NFC device such that the second substrate surface of the beam shaping NFC device faces perpendicular to an outer surface of the RFID tag.

In some embodiments, the interior surface of the printer may be metallic and concentrating the near field interrogation signals generated by the wire coil away from the interior surface reduces degradation of the near field interrogation signals when the beam shaping NFC device is disposed at the metallic interior surface of the printer.

In some embodiments, the method may further include: subsequent to energizing the transceiver, receiving, by a controller, a response signal from the RFID tag; and determining, by the controller, a ribbon type for the ribbon supply roll based on the response signal.

In some embodiments, the method may further include, by a controller: receiving a tag identifier from the RFID tag of the ribbon supply roll; determining print control parameters based on the tag identifier; and configuring the printer for a print operation based on the print control parameters.

In some embodiments, the method may further include: mounting a holder to the interior surface of the printer; and disposing the beam shaping NFC device within the holder.

Some embodiments may provide for a beam shaping NFC device. The beam shaping NFC device may include a substrate, a ferromagnetic component, a non-conductive bobbin component, and a wire coil. The substrate may define a first substrate surface and a second substrate surface opposite the first substrate surface. The ferromagnetic component may include: a core portion; and a bottom flange portion mechanically attached with the second substrate surface. The non-conductive bobbin component may include: a bobbin core portion defining a cavity configured to receive the core portion of the ferromagnetic component; and a bobbin top flange portion, wherein the bobbin top flange portion and the bottom flange portion of the ferromagnetic component are disposed at opposite ends of the core portion of the ferromagnetic component. The wire coil may be disposed around the bobbin core portion, wherein the ferromagnetic component shapes near field interrogation signals generated by the wire coil.

These characteristics as well as additional features, functions, and details of various embodiments are described below. Similarly, corresponding and additional embodiments are also described below.

BRIEF DESCRIPTION OF THE DRAWINGS

Figure 1:
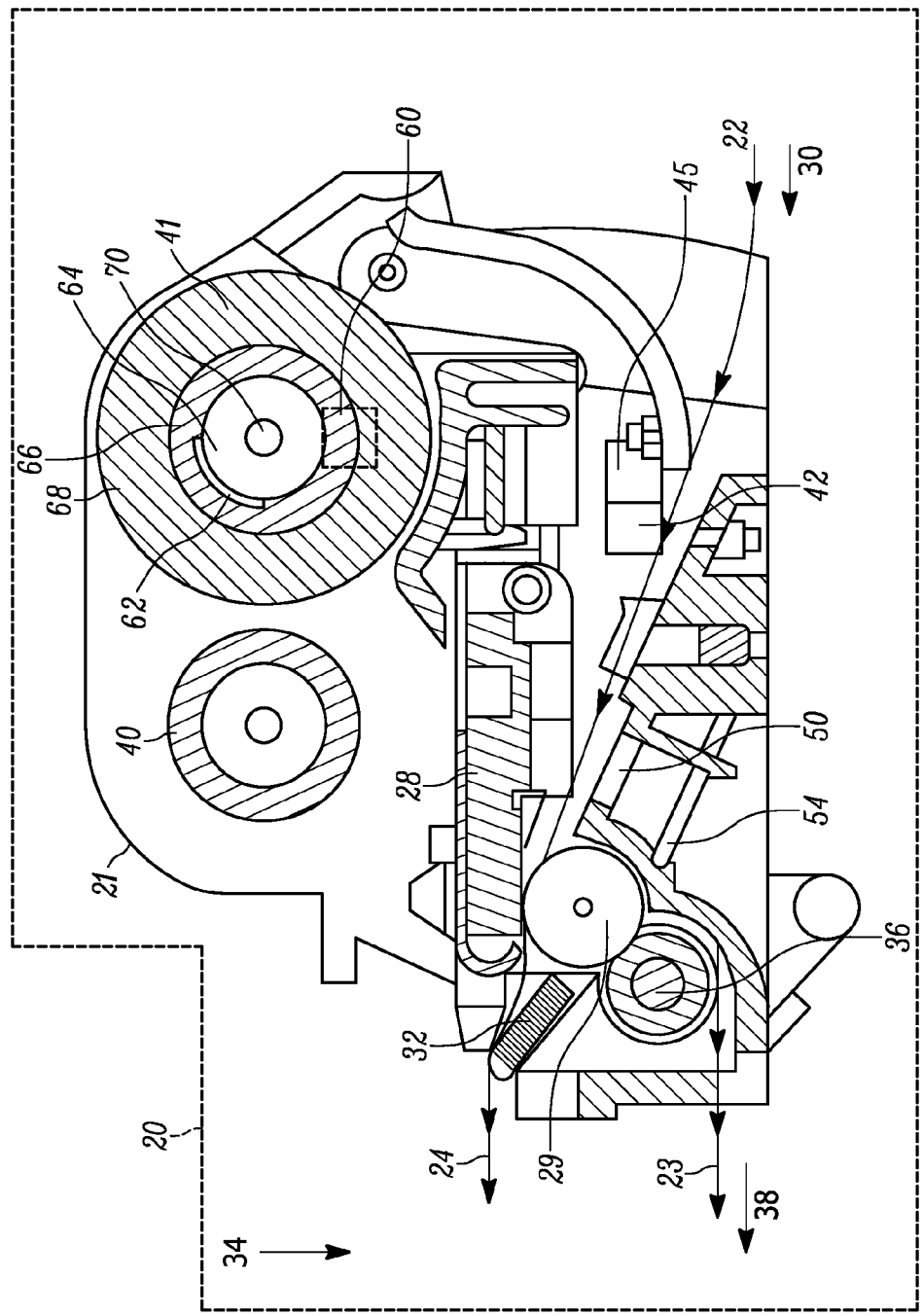
Figure 2A:
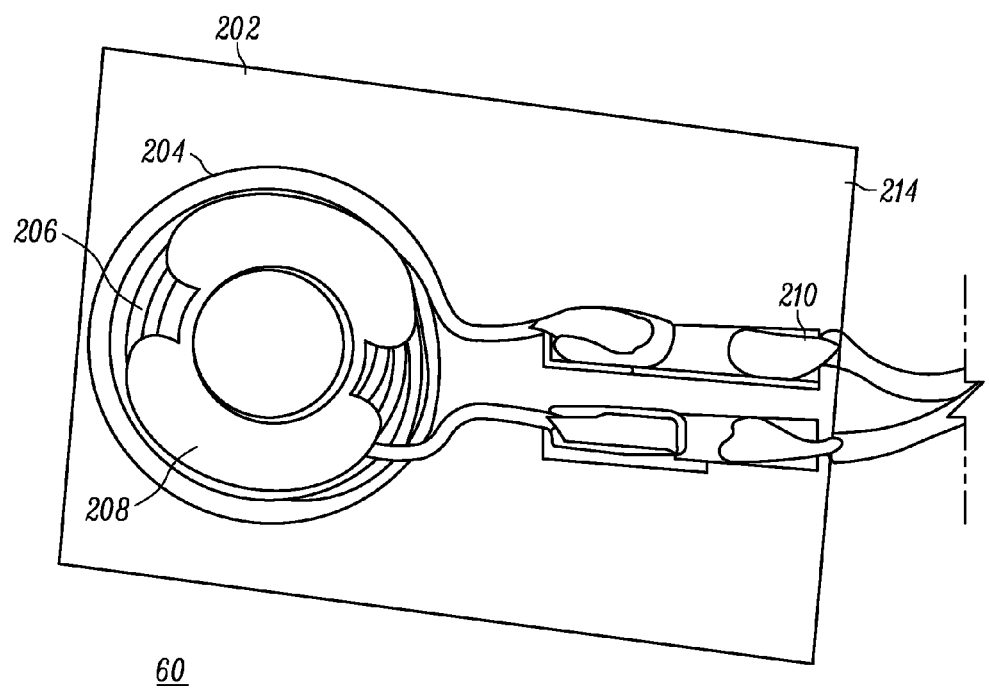
Figure 2B:
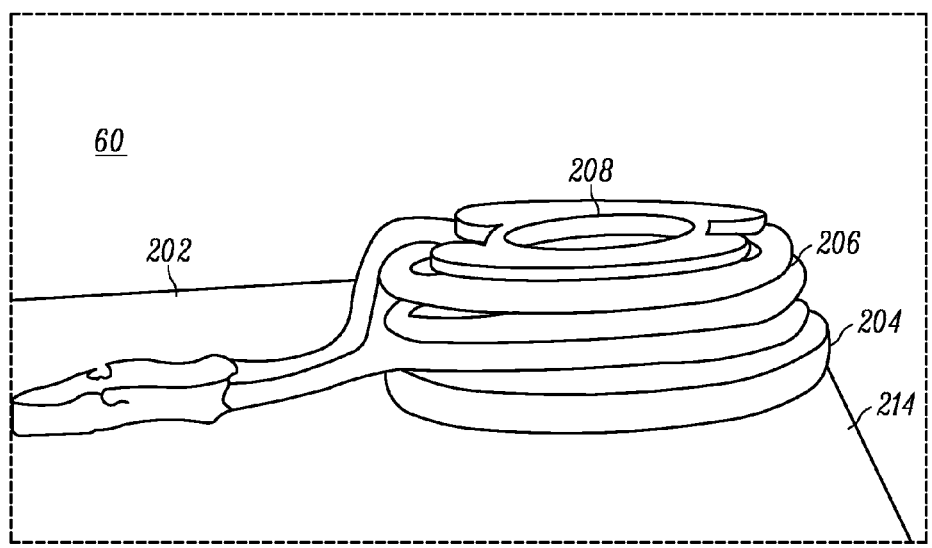
Figure 3:
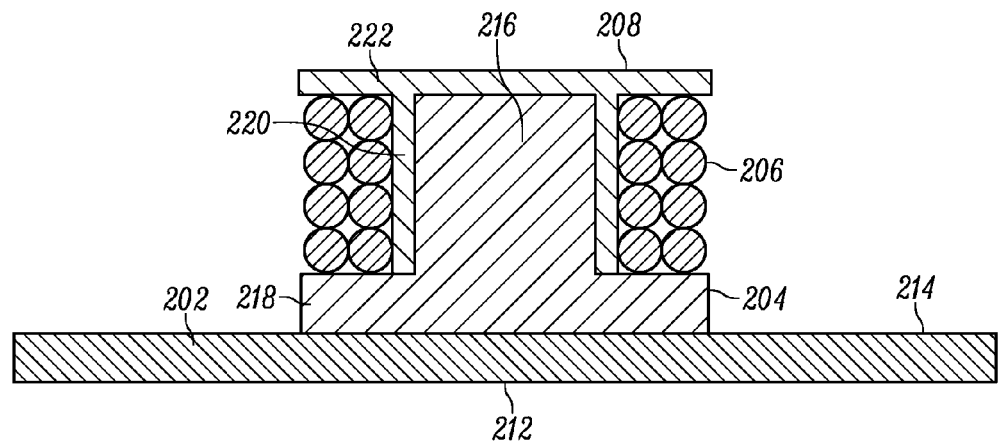
Figure 4:
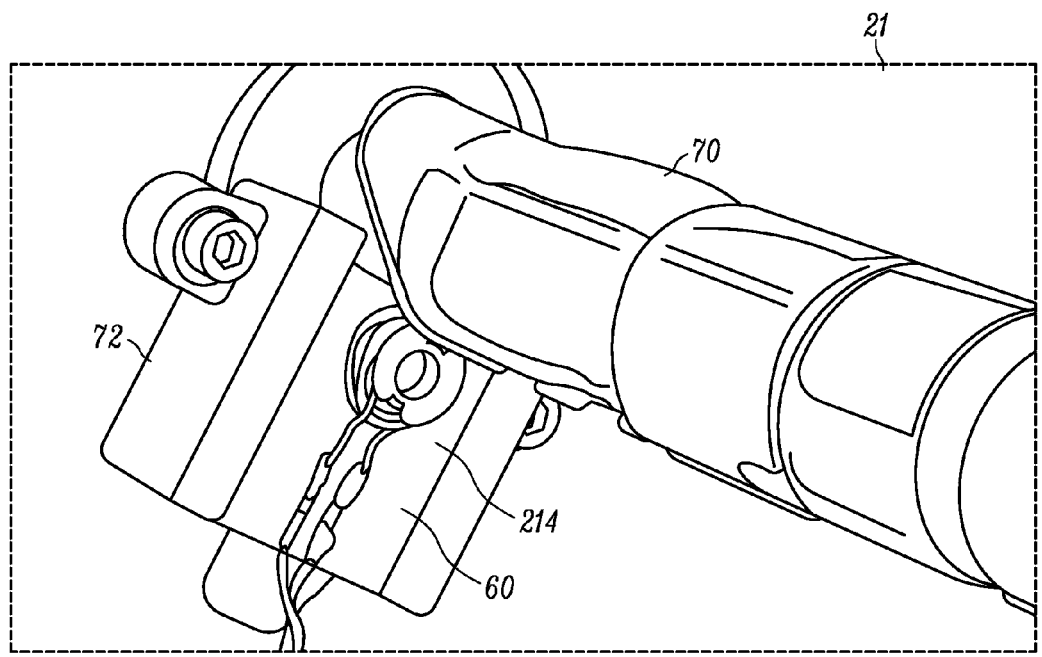
Figure 5:
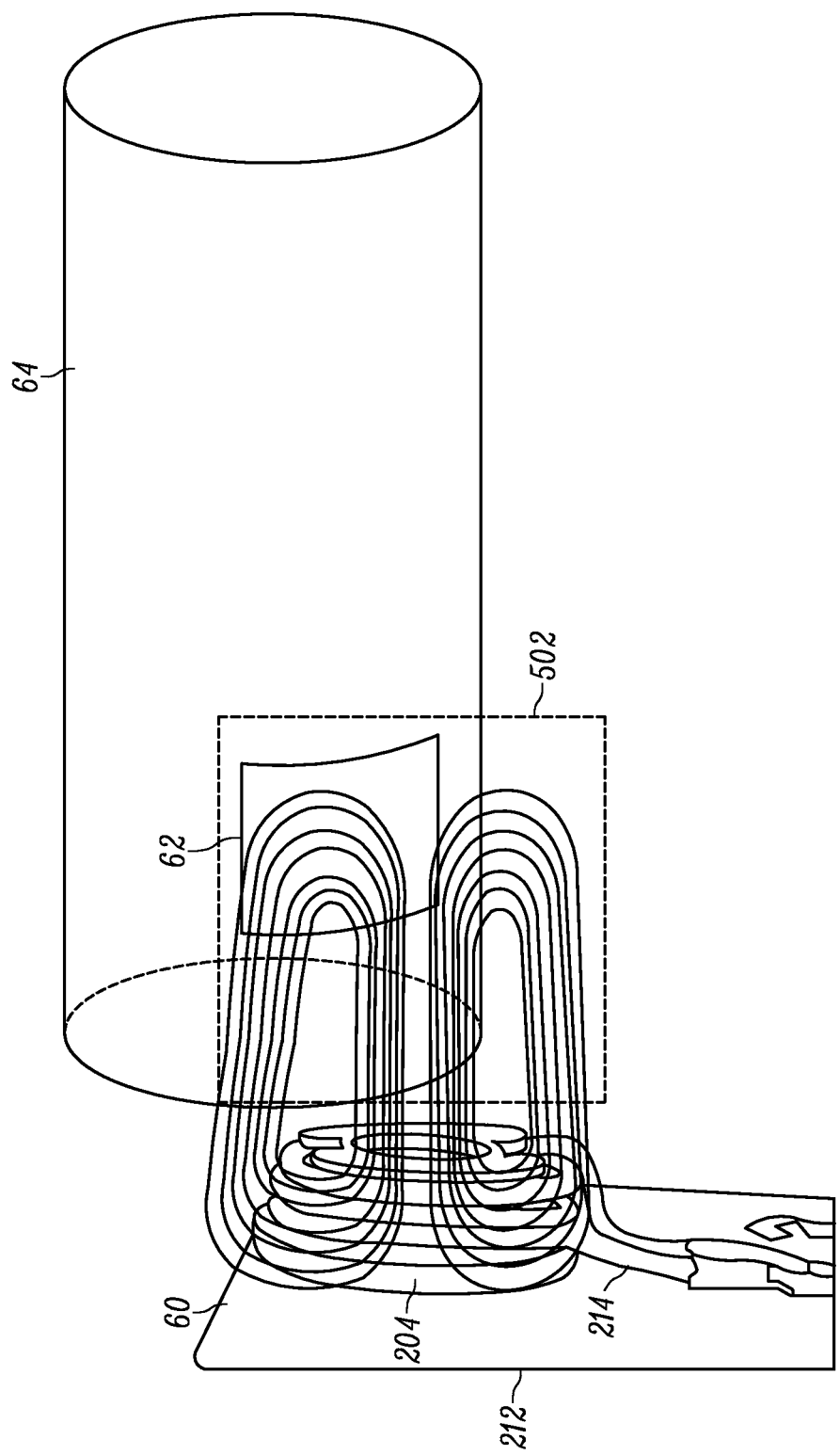
Figure 6:
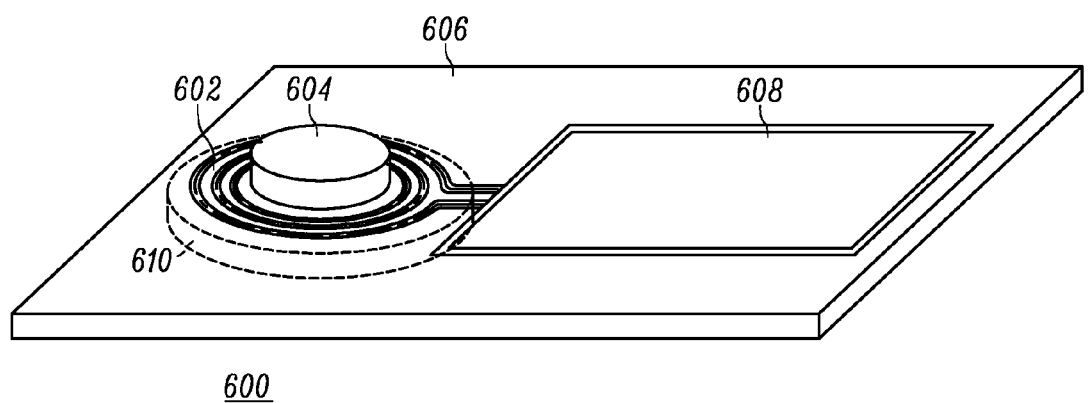

Having thus described some embodiments in general terms, reference will now be made to the accompanying drawings, which are not necessarily drawn to scale, and wherein:

FIG. 1 is a side schematic view of a printer-encoder in accordance with some embodiments;

FIGS. 2A and 2B respectively show top and side views of an example beam shaping NFC device in accordance with some embodiments;

FIG. 3 shows a cross sectional side view of the beam shaping NFC device in accordance with some embodiments;

FIG. 4 shows a close up view of the beam shaping NFC device disposed within the printer-encoder in accordance with some embodiments;

FIG. 5 shows a schematic view of a near field interrogation signal generated by the beam shaping NFC device at a near field interrogation region in accordance with some embodiments; and FIG. 6 shows an example beam shaping NFC device 600 in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

FIG. 1 shows an RFID printer-encoder 20 structured for printing and programming a series or stream of media units 24, in accordance with some embodiments. Some or all of the media units 24 may include transponders. Media units 24 may be labels, cards, etc, that are carried by a substrate liner or web 22 as shown.

Printer-encoder 20 includes several components, such as a housing 21, printhead 28, a platen roller 29, a feed path 30, a peeler bar 32, a media exit path 34, rollers 36, a carrier exit path 38, a take-up spool 40, a ribbon supply roll 41, a transceiver 42, a controller 45, a near field coupler 50, and a beam shaping NFC device 60. The web 22 is directed along the feed path 30 and between the printhead 28 and the platen roller 29 for printing indicia onto the media units 24.

Printer-encoder 20 may be configured to provide thermal transfer printing. For example, housing 21 may define an interior surface of the printer-encoder 20. A ribbon supply spool 70 may be mounted to the housing 21 on the interior surface. The ribbon supply roll 41 may be disposed on the ribbon supply spool 70 attached to the housing 21. Ribbon supply roll 41 provides a thermal ribbon that extends along a path (not shown to avoid overcomplicating FIG. 1) such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon.

Ribbon supply roll 41 may include an RFID tag 62 that can be interrogated by the beam shaping NFC device 60 for purposes such as identification of the ribbon supply roll, a ribbon supply roll type, one or more characteristics of the ribbon supply roll, and/or one or more print control parameters suitable for the ribbon supply roll. The beam shaping NFC device 60 may be further configured to encode the RFID tag 62. For example, amount data defining the amount of ribbon left on the ribbon supply roll 41 may be encoded (e.g., into a memory of the RFID tag 62) such that if the ribbon supply roll were to be removed and then later reinstalled (e.g., onto printer-encoder 20 or a different device) the amount data may be retrieved from the ribbon supply roll 41 and used by the printer to determine an estimate lifetime or replacement time of the ribbon supply 41 and/or one or more of the components (e.g., ribbon 68) of the ribbon supply roll 41.

Printer-encoder 20 may be further configured to use the amount data to generate ribbon supply roll orders. For example, controller 45 may be configured provide the amount data to a remote (e.g., cloud) server configured to monitor and generate ribbon supply roll orders based on amount data received from printer-encoders. In another example, controller 45 may be configured to perform the monitoring and generate the ribbon supply orders.

In some embodiments, ribbon supply roll 41 may further include a ribbon supply core 64, a (e.g., foil) trailer 66, and a ribbon 68. The ribbon supply core 64 may be a hollow cylindrical shape to provide structural support for the ribbon supply roll 41 and to interface with the (e.g., rod-shaped) ribbon supply spool 70. The ribbon supply core 64 may be cardboard, plastic, or other non-conductive material. The foil trailer 66 may be attached to an end of the ribbon 68. The foil trailer 66 may be wrapped around the ribbon supply core 64, and the ribbon 68 may be wrapped around the foil trailer 66. RFID tag 62 may be disposed between the ribbon supply core 64 and the foil trailer 66.

Printer-encoder 20 may be configured to provide for the wireless interrogation of the RFID tag 62 of the ribbon supply roll 41 with the beam shaping near field communication (NFC) device 60. In FIG. 1, the beam shaping NFC device 60 is shown in outline to indicate that beam shaping NFC device 60 is disposed behind the ribbon supply roll 41 proximate the interior surface of housing 21. The RFID tag 62 may include a transponder configured to provide a tag identifier and/or other information stored within the RFID tag 62 (e.g., in a memory) to the printer-encoder 20. The tag identifier may be different for different ribbon supply rolls 41 and/or different ribbon supply roll types, and thus may be used by the printer-encoder 20 to configure print control parameters suitable for the ribbon supply roll 41 or ribbon supply roll type. The ribbon supply roll 41 may be disposed at the interior side of the housing 21 proximate to the beam shaping NFC device 60 such that the RFID tag 62 is located at a near field interrogation region of the beam shaping NFC device 60.

Some example print control parameters may include sensitivity, darkness and print speed. The sensitivity parameter is associated with the temperature of the printing elements of the printhead 28. The darkness parameter is associated with the amount of time that the printing elements are activated or the amount of energy used for the same amount of time. The print speed is associated with the rate that the ribbon 68 is passed through the printhead 28. In general, different ribbon supply roll types may have different print media characteristics suitable for different print control parameters. Printer-encoder 20 may include a memory configured to store (and/or may access separate data storage, such as through a network) of tag identifiers, each tag identifier associated with a set of print control parameters most suitable for ribbon supply roll 41 identified by the tag identifier. As such, in response to receiving the tag identifier via the response signal from RFID tag 62 of the ribbon supply roll 41, controller 45 may be configured to access the associated print control parameters from the memory, and to configure the components of the print-encoder 20 for print operation in accordance with the print control parameters. In some embodiments, controller 45 may be further configured to monitor the status of the ribbon supply roll 41. For example, the revolutions of the ribbon supply spool 70 may be recorded by controller 45 and used to monitor the lifespan and quality of the ribbon supply roll 41. In some embodiments, the tag identifier may be unique to each ribbon supply roll 41, and thus controller 45 may also track the placement of particular ribbon supply rolls 41 within printer-encoder 20.

As discussed in greater detail below, beam shaping NFC device 60 may be configured to generate near field interrogation signals or patterns that are concentrated in the near field interrogation region (e.g., within 10 cm or less) of the beam shaping NFC device 60. The near field interrogation signals or patterns, as used herein, refers to electric or magnetic field signals or patterns, rather than the electromagnetic field patterns associated with conventional far field RFID technologies. The near field interrogation signals may be received by RFID tag 62 disposed at the near field interrogation region. RFID tag 62 may include one or more passive or active RFID transponders. For a passive transponder, the near field interrogation signals induce current within the RFID tag 62 that causes backscattering of a response signal to the beam shaping NFC device 60. The RFID tag 62 may be configured to provide the tag identifier and/or other information stored within the transponder via the backscattering. For an active transponder, the RFID tag 62 may be configured to power (e.g., via a battery and/or other power source separate from the interrogation signals) the broadcast the tag identifier and/or other information, such as in response to receiving an interrogation signal from the beam shaping NFC device 60. Furthermore, the components of the beam shaping NFC device 60 and their arrangement may provide for reduced degradation of the near field interrogation signals when the beam shaping NFC device 60 is disposed at the (e.g., metallic) interior surface of the printer-encoder 20 defined by housing 21.

The transceiver 42 is configured for generating and transmitting RF communication signals that are broadcasted by the beam shaping NFC device 60. The transceiver 42 and the beam shaping NFC device 60 will be referred to collectively as forming at least part of a communication system. The controller 45 may be connected with the transceiver 42 and may be configured to energize the transceiver 42 to cause the beam shaping NFC device 60 to generate the near field interrogation signals. The communication system transmits the near field interrogation signal or pattern in proximity to the near field interrogation region to establish a mutual coupling between the transceiver 42 and the RFID tag 62. The transceiver 42 may also receive the response signal from beam shaping NFC device 60, and may provide the response signal to the controller 45 to identify the ribbon supply roll 41 and/or ribbon supply roll type, set suitable print control parameters, among other things.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art. In applications, such as the depicted embodiment, in which the media units 24 are supported by a web 22, the web 22 may be guided out of the printer-encoder 20 along the carrier exit path 38 by rollers 36 or other devices.

The transceiver 42, or a separate transceiver such as transceiver 54, may be configured for generating and transmitting RF communication signals that are broadcasted by the near field coupler 50 located proximate the media feed path 30. Thus transceiver 42 (or transceiver 54) and the near field coupler 50 may also form at least a part of a communication system that transmits a near field electromagnetic signal or pattern in proximity to a transponder operating region. The communication system may be configured to establish a mutual coupling between the transceiver and a targeted transponder of a media unit that is located in the transponder operating region. As the media web 22 proceeds along the media feed path 30 through the transponder operating region, data may be read from and written to transponders disposed on media units 24 carried by the web 22. Additional details regarding near field couplers and communications between printer-encoder 20 and transponders, applicable in some embodiments, are discussed in U.S. Pat. No. 8,306,474, titled "Multi-element RFID Coupler," which is hereby incorporated by reference in its entirety. The beam shaping NFC device 60 is configured to target RFID tag 62 of the ribbon supply roll 41 for interrogation, and to avoid interrogation of the non-targeted RFID transponders of the media units located within the interior of the housing 21 by concentrating the near field interrogation signals at the near field interrogation region of the beam shaping NFC device 60. In some embodiments, a printer including beam shaping NFC device 60 may be independent of any media unit encoding and/or interrogation. Here, the printer may not include components such as transceiver 54 and near field coupler 50.

In some embodiments, the printer-encoder 20 may further include a beam shaping NFC device configured to interrogate a media unit supply roll. For example, the media unit supply roll may be mounted to the housing 21 and may include an RFID tag, as discussed herein for the ribbon supply roll 41 and RFID tag 62. Through the beam shaping NFC device, printer-encoder 20 may be further configured to read and write data to the media unit supply roll for purposes such as identification of the media unit supply roll, a media unit supply roll, one or more characteristics of the media unit supply roll, one or more print control parameters suitable for the media unit supply roll. In another example, the beam shaping NFC device may be further configured to encode the RFID tag of the media unit supply roll, such as with data defining the amount of unused media units remaining on the media unit supply roll.

FIGS. 2A and 2B respectively show top and side views of an example beam shaping NFC device 60 in accordance with some embodiments. FIG. 3 shows a cross sectional side view of the beam shaping NFC device 60. While beam shaping NFC device 60 is discussed herein as being included in printer-encoder 20, it may also be used in other contexts where it is advantageous to concentrate near field interrogation signals within a near field interrogation region (e.g., to avoid undesired interrogation of any nearby, non-targeted transponders outside of the near field interrogation region) that are also directed away from nearby conductive components (e.g., metallic housing 20) that would otherwise cause interference or detuning of the interrogation signals (and/or response signals).

With reference to FIGS. 2A, 2B, and 3, the beam shaping NFC device 60 may include a substrate 202, a ferromagnetic component 204, a wire coil 206, a bobbin component 208, and a connector 210. The substrate 202 defines a first substrate surface 212 (as shown in FIG. 3) and a second substrate surface 214 opposite the first substrate surface 212. As discussed in greater detail below, the beam shaping NFC device 60 may be disposed within the printer-encoder 20 such that the first substrate surface 212 faces the interior side of the printer-encoder 20 (e.g., defined by housing 21) and the second substrate surface 214 faces the near field interrogation region 502 (as shown in FIG. 5) of the beam shaping NFC device 60. Substrate 202 may be formed of a nonconductive material such as plastic, fiberglass, phenolics, printed circuit board material, among other things.

As shown in FIG. 3, ferromagnetic component 204 includes a core portion 216 and a bottom flange portion 218. The core portion 216 and the bottom flange portion 218 may be formed of a single ferromagnetic component, or alternatively, may be separate components that are joined together. The core portion 216 and the bottom flange portion 218 may each include a cylindrical shape, with core portion 216 including a smaller radius than the bottom flange portion 218 to define the flange structure.

However, other shapes for the core portion 216 and/or bottom flange portion 218 may also be used. The ferromagnetic component 204 may be a high frequency (e.g., 13.56 MHZ range) transformer core material, such as K1 ferrite. The ferromagnetic component 204 may be mechanically attached with the second substrate surface 214 via the bottom flange portion 218, such as by a non-conductive adhesive material.

The wire coil 206 is disposed around the core portion 216 of the ferromagnetic component 204, such as in the region defined between the bottom flange portion 218 of the ferromagnetic component 204 and the bobbin top flange portion 220 of the bobbin component 208 (discussed in greater detail below). The wire coil 206 may be connected with the transceiver 42 via the contacts 210. When the controller 45 energies the transceiver 42, an interrogation signal is generated by the transceiver 42 and transmitted to the wire coil 206 via the contacts 210. The resulting current caused by the interrogation signal that travels through the wire coil 206 induces near field patterns. The ferromagnetic component 204 is structured to direct and/or shape the (e.g., magnetic) field pattern generated by the wire coil by causing the field pattern generated by the wire coil 206 to be less concentrated in the regions of the ferromagnetic component 204, and more concentrated in the other regions of the field pattern generated by the wire coil 206 (e.g., at the interrogation region of the beam shaping device 60).

The beam shaping NFC device 60 may further include the bobbin component 208 to provide a nonconductive separation between the ferromagnetic component 204 and the wire coil 206. The bobbin component 208 may be formed of a nonconductive material, such as a polymer material. With reference to FIG. 3, the bobbin component 208 may include a bobbin core portion 220 and a bobbin top flange portion 222. The bobbin core portion 220 defines a cavity configured to receive the core portion 216 of the ferromagnetic component 204. Where the core portion 216 includes a cylindrical shape, the cavity of the bobbin core portion 220 may include a corresponding cylindrical shape, and the core portion 216 of the ferromagnetic component 204 may be mechanically secured with the bobbin core portion 220 (e.g., via a non-conductive adhesive material). Once secured, the bobbin top flange portion 222 and the bottom flange portion 218 of the ferromagnetic component 204 are disposed at opposite ends of the core portion 216 of the ferromagnetic component 204. The wire coil 206 may be disposed around the bobbin core portion 220 between the bobbin top flange portion 222 and the bottom flange portion 218 of the ferromagnetic component 204.

FIG. 4 shows a close up view of beam shaping NFC device 60 disposed within printer-encoder 20 in accordance with some embodiments. Here, ribbon supply roll 41 has been removed from ribbon supply spool 70, visually exposing the beam shaping NFC device 60 (e.g., shown in outline behind ribbon supply roll 41 in FIG. 1). The printer-encoder 20 may include a holder 72 mounted to the interior surface of the housing 21 and configured to removably receive the beam shaping NFC device 60. The holder 72 may be formed of a conductive material and may secure the beam shaping NFC device 60 to housing 21.

FIG. 5 shows a schematic view of a near field interrogation pattern generated by the beam shaping NFC device 60 at a near field interrogation region, in accordance with some embodiments. As discussed above, the beam shaping NFC device 60 may be secured with the interior surface of the housing 21 such that the second substrate surface 214 of the beam shaping NFC device 60 faces perpendicular to an outer surface of the RFID tag 62. The beam shaping NFC device 60 and the RFID tag 62 oriented 90 degrees with respect to each other provides a perpendicular mutual coupling between the beam shaping NFC device 60 and the RFID tag 62.

The ferromagnetic component 204 concentrates the near field interrogation signals generated by the wire coil 206 at the near field interrogation region 502 (as shown by the arrows in FIG. 5). For example, the core portion 216 of the ferromagnetic component 204 concentrates the flux of the near field concentrations away from the interior of wire coil 206 where the core potion 216 is located. Furthermore, bottom flange portion 218 of the ferromagnetic component 204 concentrates the flux of the near field concentrations away from the metallic interior surface of the printer-encoder 20. The energy which has been concentrated away or captured from these regions are transferred or projected to the near field interrogation region 502, thereby enhancing the strength of the near field interrogation signal at the desired near field interrogation region 502 and reducing the strength at the undesirable locations, such as locations near conductive components of the printer-encoder 20.

The near field concentrations propagate through the ribbon 68 and the foil trailer 66 (not shown in FIG. 5 to avoid overcomplicating the drawing) and to the RFID tag 62 disposed between the ribbon supply core 64 and the foil trailer 66. Advantageously, the concentration of the near field interrogation signals at the near field interrogation region 502 allows for the near field interrogation signals to satisfy (e.g., exceed or meet) the activation level of the RFID tag 62 after the near field interrogation signals have propagated through the ribbon supply core 64 and the foil trailer 66 at a lower power level than would otherwise be possible. Therefore, the amount of power that is needed by the beam shaping NFC device 60 for effective interrogation of the RFID tag 62 within the ribbon supply roll 41 is reduced by the ferromagnetic component 204 via the concentration of the near field pattern at the near field interrogation region 502 and reduction of the near field pattern outside of the near field interrogation region 502

Furthermore, where the interior surface of the printer-encoder 20 is metallic, the ferromagnetic component 204 concentrates the near field interrogation signals generated by the wire coil away from the interior surface (e.g., facing the first substrate surface 212 of the housing), thereby reducing degradation of the near field interrogation signals when the beam shaping NFC device 60 is disposed at and/or near the metallic interior surface of the printer-encoder as shown in FIGS. 1 and 4. As such, via the shaping of the field pattern, the ferromagnetic component 204 concentrates the near field interrogation signals generated by the wire coil 206 toward the near field interrogation region (e.g., where the RFID tag 62 of the ribbon supply roll 41 is disposed) and away from the (e.g., conductive) interior surface of the housing 62.

The wire coil that generates the near field patterns is not limited to the coiled wiring shown in FIGS. 2A-5. In some embodiments, the wire coil 206 may be formed as wire traces on a printed circuit board (PCB) substrate. FIG. 6 shows an example beam shaping NFC device 600 in accordance with some embodiments. The wire trace coil 602 may define a center region where a ferromagnetic component 604 may be disposed through the PCB substrate 606. The discussion above regarding ferromagnetic component 204 may be applicable to ferromagnetic component 604. The PCB 606 may include an aperture configured to receive the core portion of the ferromagnetic component 604. The bottom flange portion 610 of the ferromagnetic component 604 may be disposed at the opposite surface of PCB substrate 606. In some embodiments, printer-encoder electronics 608 may also be disposed on the same PCB substrate 606, such integrated circuitry configured to perform the functionality of one or more of transceiver 42 or controller 45 as discussed above.

CONCLUSION

Many modifications and other embodiments will come to mind to one skilled in the art to which these embodiments pertain having the benefit of the teachings presented in the foregoing descriptions and the associated drawings. For example, the ferromagnetic core discussed herein is particularly adapted for concentrating near field interrogation signals based on the relative positions of the beam shaping NFC device and the RFID tag, but other ferromagnetic core structures may be appropriate based on beam shaping need. In another example, the beam shaping NFC device discussed herein may be used within devices other than printer-encoders, such as non-encoding printers, mobile devices, desktop devices, among other things. In yet another example, the beam shaping NFC device may be used during ribbon supply roll manufacturing to write and verify part numbers, such as the ribbon supply type being wound to a (e.g., universal) ribbon supply core. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A printer, comprising:
 a housing defining an interior surface of the printer;
 a beam shaping near field communication (NFC) device mechanically secured with the interior surface, the beam shaping NFC device including:
  a substrate defining a first substrate surface and a second substrate surface opposite the first substrate surface, wherein the first substrate surface faces an interior side of the printer and the second substrate surface faces a near field interrogation region of the beam shaping NFC device;
  a ferromagnetic component, including:
   a core portion; and
   a flange portion mechanically attached with the second substrate surface; and
  a wire coil disposed around the core portion, wherein the ferromagnetic component concentrates near field interrogation signals generated by the wire coil toward the near field interrogation region and away from the interior surface of the printer; and
 a ribbon supply spool to mount a ribbon supply roll to the interior side of the housing, the ribbon supply roll including:
  a ribbon supply core;
  a ribbon;
  a foil trailer attached to an end of the ribbon, wherein the foil trailer is wrapped around the ribbon supply core and the ribbon is wrapped around foil trailer; and
  an RFID tag disposed between the ribbon supply core and the foil trailer, wherein the ribbon supply roll is disposed at the interior side of the housing proximate to the beam shaping NFC device such that the RFID tag is located at the near field interrogation region of the beam shaping NFC device.

2. The printer of claim 1, wherein:
 the beam shaping NFC device further includes a non-conductive bobbin component including:
  a bobbin core portion defining a cavity configured to receive the core portion of the ferromagnetic component; and
  a bobbin flange portion, wherein the bobbin flange portion and the flange portion of the ferromagnetic component are disposed at opposite ends of the core portion of the ferromagnetic component; and
 the wire coil is disposed around the bobbin core portion between the bobbin flange portion and the flange portion of the ferromagnetic component.

3. The printer of claim 1, wherein the ferromagnetic component concentrates the near field interrogation signals generated by the wire coil at the near field interrogation region such that the near field concentrations, after propagating through the ribbon and foil trailer, satisfy an activation level of the RFID tag.

4. The printer of claim 1, wherein the beam shaping NFC device is secured with the interior surface such that the second substrate surface of the beam shaping NFC device faces perpendicular to an outer surface of the RFID tag.

5. The printer of claim 1, wherein the interior surface of the printer is metallic and the ferromagnetic component concentrates the near field interrogation signals generated by the wire coil away from the interior surface, thereby reducing degradation of the near field interrogation signals when the beam shaping NFC device is disposed at the metallic interior surface of the printer.

6. The printer of claim 1, further comprising:
 a transceiver connected the wire coil; and
 a controller connected with the transceiver and configured to:
  energize the transceiver to cause the wire coil to generate the near field interrogation signals;
  subsequent to energizing the transceiver, receive a response signal from the RFID tag; and
  determine a ribbon type for the ribbon supply roll based on the response signal.

7. The printer of claim 1, further comprising a controller configured to:
 receive a tag identifier from the RFID tag of the ribbon supply roll;
 determine a print control parameter based on the tag identifier; and
 configure the printer for a print operation based on the print control parameter.

8. The printer of claim 1, further comprising a holder mounted to the interior surface of the printer and configured to removably receive the beam shaping NFC device.

9. A method, comprising:
 securing a beam shaping NFC device with an interior surface of a housing of a printer and proximate to a ribbon supply roll mounted to the interior side of the housing such that an RFID tag of the ribbon supply roll is at a near field interrogation region of the beam shaping NFC device;
 energizing a transceiver connected with the beam shaping NFC device to cause a wire coil of the beam shaping NFC device to generate near field interrogation signals; and
 concentrating, with a ferromagnetic component, the near field interrogation signals generated by the wire coil at the near field interrogation region and away from the interior surface of the printer, wherein:

the ribbon supply roll includes:
  a ribbon supply core;
  a ribbon; and
  a foil trailer attached to an end of the ribbon, wherein the foil trailer is wrapped around the ribbon supply core and the ribbon is wrapped around foil trailer; and the RFID tag is disposed between the ribbon supply core and the foil trailer, wherein the ribbon supply roll is disposed at an interior side of the housing proximate to the beam shaping NFC device such that the RFID tag is located at the near field interrogation region of the beam shaping NFC device.

10. The method of claim 9, wherein:

the beam shaping NFC device includes a substrate defining a first substrate surface and a second substrate surface opposite the first substrate surface, wherein the first substrate surface faces the interior side of the printer and the second substrate surface faces the near field interrogation region of the beam shaping NFC device;

the ferromagnetic component includes:
  a core portion; and
  a flange portion mechanically attached with the second substrate surface; and the wire coil is disposed around the core portion.

11. The method of claim 10, wherein:

the beam shaping NFC device further includes a non-conductive bobbin component including:
  a bobbin core portion defining a cavity configured to receive the core portion of the ferromagnetic component; and
  a bobbin flange portion, wherein the bobbin flange portion and the flange portion of the ferromagnetic component are disposed at opposite ends of the core portion of the ferromagnetic component; and the wire coil is disposed around the bobbin core portion between the bobbin flange portion and the flange portion of the ferromagnetic component.

12. The method of claim 9, wherein concentrating the near field interrogation signals generated by the wire coil at the near field interrogation region includes concentrating the near field interrogation signals such that the near field concentrations, after propagating through the ribbon and foil trailer, satisfy an activation level of the RFID tag.

13. The method of claim 9, wherein securing the beam shaping NFC device with the interior surface of the housing includes securing the beam shaping NFC device such that the second substrate surface of the beam shaping NFC device faces perpendicular to an outer surface of the RFID tag.

14. The method of claim 9, wherein:

the interior surface of the printer is metallic; and concentrating the near field interrogation signals generated by the wire coil away from the interior surface reduces degradation of the near field interrogation signals when the beam shaping NFC device is disposed at the metallic interior surface of the printer.

15. The method of claim 9 further comprising:

subsequent to energizing the transceiver, receiving, by a controller, a response signal from the RFID tag; and determining, by the controller, a ribbon type for the ribbon supply roll based on the response signal.

16. The method of claim 9 further comprising, by a controller:

receiving a tag identifier from the RFID tag of the ribbon supply roll;

determining a print control parameter based on the tag identifier; and configuring the printer for a print operation based on the print control parameter.

17. The method of claim 9 further comprising:

mounting a holder to the interior surface of the printer; and disposing the beam shaping NFC device within the holder.

* * * * *